UNITED STATES PATENT OFFICE.

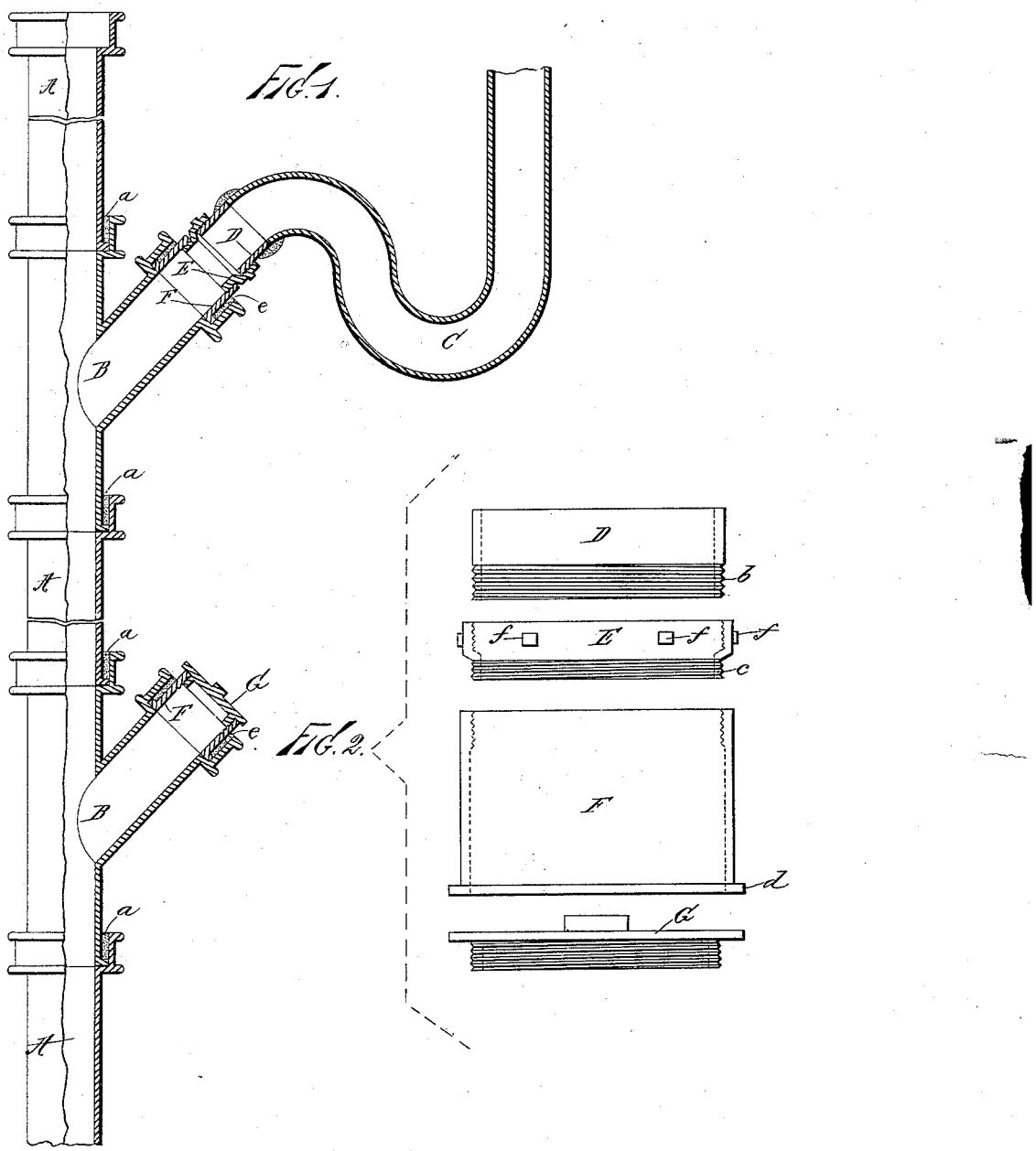

PAUL A. RENTON, OF BROOKLYN, NEW YORK.

CONVERTIBLE FITTING FOR SEWER-GAS TRAPS AND WASTE-PIPING.

SPECIFICATION forming part of Letters Patent No. 441,775, dated December 2, 1890.

Application filed October 8, 1889. Serial No. 326,336. (No model.)

*To all whom it may concern:*

Be it known that I, PAUL A. RENTON, of Brooklyn, county of Kings, and State of New York, have invented certain new and useful Improvements in Convertible Fittings for Sewer-Gas Traps and Waste-Pipes, of which the following is a full, clear, and exact description, reference being had to the accompanying drawings, and to the letters of reference marked thereon.

My invention has relation to fittings or appliances intended for use in connection with sewer-gas traps and waste-pipes, and has for its object the production of a simple, cheap, effective, and easily-applicable fitting, by use of which the trap (usually of lead) may be quickly mounted and secured in place upon or in connection with the waste-pipe (usually of cast-iron) or easily detached therefrom for purposes of cleaning, &c, the joints being perfectly secure and not subject to damage, and by use of which all the calked joints in the system, including that next the trap, may be readily subjected to the hydraulic test of perfection and stability. To accomplish all of this and to secure other and further advantages in the matters of construction, application, operation, and use, my improvements involve certain novel and useful arrangements or combinations of parts and peculiarities of construction, as will be herein first fully described, and then pointed out in the claim.

In the accompanying drawings, forming part of this specification, I have represented at Figure 1 a vertical view, partly in section and partly in elevation, of a portion of a waste-pipe having Y's or branches to receive sewer-gas traps, one having a trap connected therewith by my improved fitting and the other being stopped or sealed, as when water-pressure is to be applied for testing the joints. Fig. 2 is an elevation showing the four essential pieces or parts of the improved appliance detached from each other.

In both the figures like letters of reference wherever they occur indicate corresponding parts.

A A A are any sections of a waste-pipe united with Y's or branches, as B B, upon which sewer-gas traps are to be mounted, and the illustration in Fig. 1 is intended to represent any system, arrangement, or location of waste-pipes such as is found in dwellings and other buildings. The sections and Y's are usually of cast-iron, and the joints between them are what are called "calked joints," being made by introducing a quantity of lead, as at *a a*, and then to make the union between lead and iron as secure as possible the lead is driven or calked by a suitable tool. These joints are sometimes required to be tested, and the method of testing is to close the Y's or branches and the discharge end of the system and then introduce water above the last or highest joint either by turning it in above or pumping it in from below. Any leakage discloses defective plumbing, which may require to be remedied.

The traps are usually made of lead, one of which is represented at C. To connect the lead trap with the iron branch and with proper security has heretofore been a matter of great difficulty, involving much labor and expense and resulting in a union which could not be disjointed without destroying the trap or a portion thereof, and which would not permit ready access to the interior of the waste-pipe for cleaning out obstructions. According to my improvements I make a fitting most plainly represented in Fig. 2, wherein D is a ferrule of brass, which is to be soldered in or upon the end of the trap. This solder joint can be easily and perfectly made, and may be tested before leaving the shop. The exposed end of ferrule D is supplied with a winding or screw thread, (represented at *b*.)

E is a union-piece, preferably of brass, having an interior thread or winding to receive that upon the ferrule D, and an exterior thread or winding on the other end, (represented at *c*.)

F is a thimble or collar having a flange *d* at one end calculated to enter the mouth of one of the branches of the waste-pipe and to fit rather snugly therein against the shoulder thereof, and this collar is threaded to receive the union-piece. It should be observed that one of the threads on the union-piece is right-handed and the other left handed, so that when the union-piece is turned, the trap being held without turning, it will draw the ferrule and collar toward or from each other, as will be readily understood.

For cheapness the collar may be made of cast-iron. It is seated in the branch and the joint therewith made secure by leading and calking, as at *e*, the same as with parts of the waste-pipe. The parts being thus finished and located, the trap can be instantly seated and mounted in connection with the waste-pipe by simply turning the union-piece. It may be as easily unseated and detached whenever required for any purpose. To facilitate turning the collar, it may have a number of lugs or projections, as at *f f*, to receive a spanner-wrench. It will be observed that this wrench may be operated in very cramped places with little or no difficulty, whereas another form of union between the branch and trap may be extremely difficult and unhandy to make.

G is a simple plug or stopper made to fit the threaded end of collar F.

After the waste-pipe is set up and joints finished and collars located the plug is inserted and the water-test applied. This, as will be seen, serves also to test the calked joint next the trap, which is quite as important as any of the others and has heretofore not been so tested. After the test the plug or plugs are removed whenever it may be desired to locate a trap and the trap applied, as above explained. The plugs may remain on any branches which may be required for future application of traps or other fittings.

The fitting may of course be made of any desired size.

The fitting made in accordance with the above explanations is convenient, cheap, and well calculated to answer the purpose or object of the invention previously stated.

Having now fully described my invention, what I claim as new herein, and desire to secure by Letters Patent, is—

The improved pipe-fitting herein described and shown, consisting of a ferrule D, secured to the gas-trap and having an exteriorly-threaded end, the ferrule F, secured to the end of the water-pipe and having an interiorly-threaded end, and the thimble E, having reversely-threaded ends adapted to engage the ferrules D and F and provided with a series of outwardly-projecting lugs, as specified.

In testimony that I claim the foregoing I have hereunto set my hand in the presence of two witnesses.

PAUL A. RENTON.

Witnesses:
JOHN BUCKLER,
WORTH OSGOOD.